July 29, 1958    E. A. ROBBINS    2,845,085
SEPARABLE, YIELDABLE MOUNTING FOR VALVES
Filed Dec. 12, 1955                            2 Sheets-Sheet 1
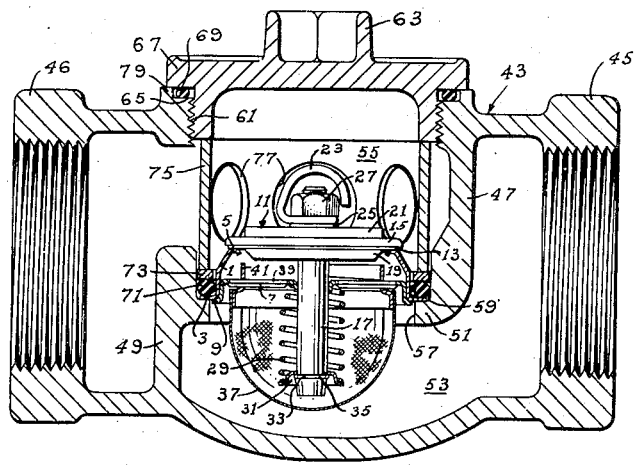
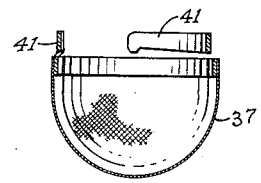
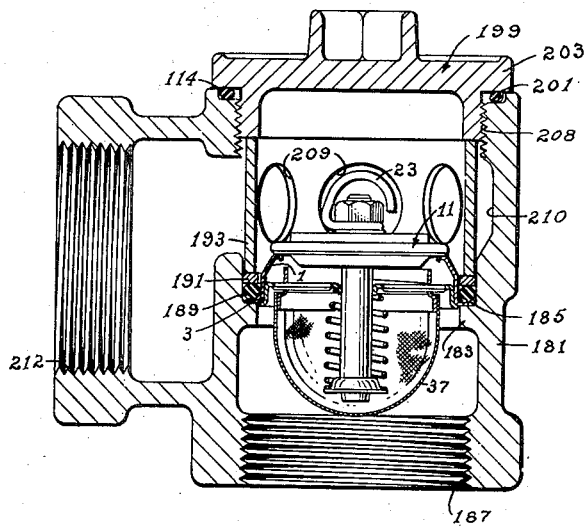
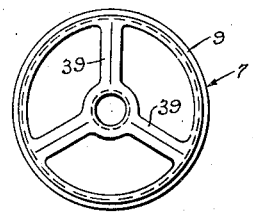
INVENTOR.
Elmer A. Robbins
BY
*Edmund W. C. Kamm*
ATTORNEY July 29, 1958 E. A. ROBBINS 2,845,085
SEPARABLE, YIELDABLE MOUNTING FOR VALVES
Filed Dec. 12, 1955 2 Sheets-Sheet 2

INVENTOR.
Elmer A. Robbins
BY
ATTORNEY

United States Patent Office 2,845,085
Patented July 29, 1958

2,845,085

SEPARABLE, YIELDABLE MOUNTING FOR VALVES

Elmer A. Robbins, Fort Wayne, Ind., assignor to Tokheim Corporation, Fort Wayne, Ind., a corporation of Indiana Application December 12, 1955, Serial No. 552,552

18 Claims. (Cl. 137—454.6)

This invention relates to a separable cushioned mounting for valves. More specifically it relates to means for removably mounting, in a body, a unit type valve preferably of the poppet type, said mounting being yieldable so that the valve unit will not be subjected to strain when the valve is mounted in the body or when the body in which the valve is mounted is connected in a pipe line.

It is therefore an object of the invention to provide a structure which includes a seat, a valve, a spring and guide means constructed as a unit which can be readily inserted or removed from a body.

Another object of the invention is to provide means for readily mounting one or more such valve units in a body.

Still another object of the invention is to provide means for yieldably and sealingly mounting the valve unit in the body.

Yet another object of the invention is to provide means for yieldably and sealingly mounting a number of valves in a body.

A further object of the invention is to provide a structure in which one or more valve units may be inserted or removed from a valve body without disturbing the connections with the pipe line to which the body is connected.

A further object is to provide a structure in which removal of the valve brings the associated parts out of the body with it.

These and other objects will become apparent from a study of this specification and the drawings which are attached hereto, made a part hereof and in which:

Figure 1 is an elevation partly in section of a horizontal check valve embodying the invention.

Figure 2 is an elevation of the screen basket.

Figure 3 is a plan view of the valve guide and spring seat.

Figure 5 is an elevation, partly in section showing the invention applied to a single poppet angle check valve.

Figure 4:
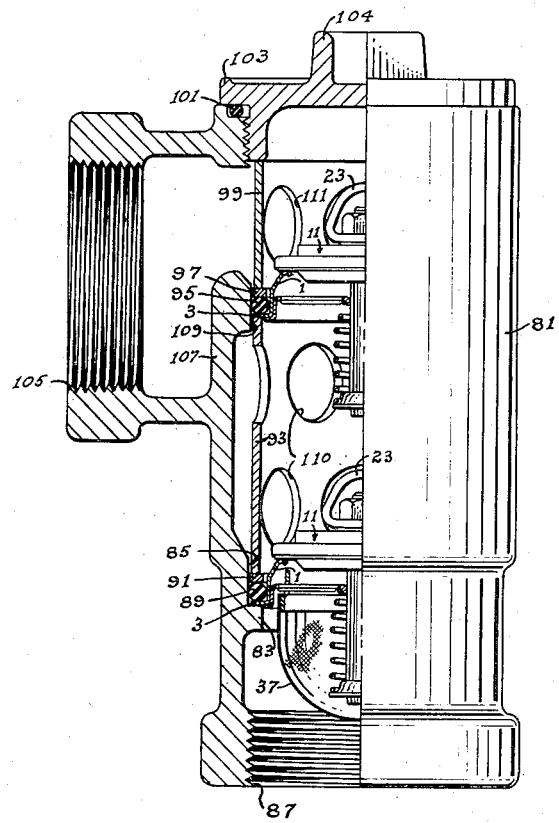
Figure 4 is an elevation of the invention applied to a double poppet angle valve.

*Single poppet horizontal check valve*
*Figures 1 to 3*

Referring first to Figure 1 the unitary valve will first be described. The valve comprises a cylindrical barrel or ring member 1 which has a radial flange 3 and a seat portion 5. A combined guide and spring seat member 7 is formed to enter the ring member a distance which is determined by the flange 9 on the member.

A valve unit indicated generally by numeral 11 comprises a yieldable valve member 13 preferably of a synthetic rubber material, which is mounted in a valve disc 15 and is supported on a stem 17 between the washers 19 and 21 which are held in place on the stem by means of a fixed bail 23, a lockwasher 25 and nut 27 which is threaded on the stem.

A helical spring 29 is disposed around the stem and bears at one end on the guide and spring seat member 7 and a spring seat 31 which is held in place on the stem by a split ring 33 which is mounted in a groove 35 in the valve stem.

If desired, a screen basket 37 may be suspended from radial arms 39 formed in the guide member 7 by means of horizontally and circumferentially directed arms 41 fixed to the screen basket which are engaged with the radial arms of the member by moving the screen basket upwardly and then rotating it.

The body 43 of the valve has the usual threaded inlet and outlet bosses 45, 46 which are in axial alignment for connecting the body in a pipe line. The central portion of the body is provided with a wall 47 disposed adjacent the inlet and which is connected with the upper and side portions of the body while a wall 49 disposed adjacent the outlet is connected with the lower and side portions of the body. A horizontal wall 51 is formed integrally with the walls 47 and 49 as well as with the sides of the body to define with them the inlet and outlet chambers 53, 55.

The wall 51 is provided with a flange 57 which extends radially inwardly and coaxially with a vertical bore 59 which defines a cylindrical sealing surface. The central axes of the flange and bore are substantially perpendicular to and intersect the central axes of the bosses 45 and 46.

A threaded bore 61 is formed in the upper portion of the body, substantially coaxial with the bore 59 and a plug 63 is mounted therein as a closure and as a gasket compressing means.

A counterbore 65 surrounds bore 61 and a flange 67 extends radially outwardly from the plug, over the counterbore. An O-ring gasket 69 of yieldable, preferably synthetic rubber material, is compressed between the flange 67 and the bottom face of the counterbore to seal the joint.

The flange 3 of the valve unit rests upon the upper surface of the flange 57 and an O-ring gasket 71 preferably of synthetic rubber rests on top of the flange 3 and around the barrel 1 of the valve. A metal seal ring 73 is disposed on top of the gasket and is engaged by the bottom edge of a cylindrical sleeve 75. The upper end of the sleeve abuts the bottom surface of the plug 63. Ports or openings 77 are formed in the sleeve to permit the passage of liquid out of the chamber 55 to outlet boss 46.

It will be seen that by properly proportioning the various parts, the gasket 69 will be compressed by the flange 67 at the same time that the gasket 71 is compressed against the top of flange 3 by the ring 73, sleeve 75 and the end of plug 63 as the latter is screwed into the threaded bore 61. This action serves to deform the gasket 71 into sealing relation between barrel member 1 and the sealing surface defined by the bore 59. Contact between the flange 67 and the boss 79 surrounding counterbore 65 limits the inward motion of the plug and thus limits the degree of compression of the gaskets. An adequate seal is thus established at both joints.

The valve unit and strainer can be quickly removed for repair or replacement or for cleaning the strainer merely by unscrewing the plug and removing the valve 11, ring 73 and sleeve 75 by means of a hook which may be engaged with the bail 23 and lifting all of the parts out of the body.

The flow of liquid is, of course, into the body through boss 45, to chamber 53, through screen 37, the valve 11 which is lifted from seat 5 by the flow against the action of spring 29, into chamber 55, through the slots 77 in sleeve 75 and out through the outlet boss 46.

Any flow in the reverse direction or stoppage of flow will permit the spring 29 to seat the valve 11 and the reverse flow will be checked.

*Double poppet angle check valve*
*Figure 4*

Figure 4 discloses an angle valve employing a double valve arrangement. The body of the valve 81 is provided with a flange 83 and a counterbore 85 which defines a sealing surface disposed substantially coaxial with and above the inlet opening 87 and the flange 3 of a valve unit 11 with attached strainer 37 rests on the flange. An O-ring gasket 89, a seal ring 91 and a sleeve 93 are disposed above the flange 3. Gasket 89 seals against the surface defined by counterbore 85 and member 1 of the valve when compressed by ring 91.

The flange 3 of a second valve unit 11 rests on the upper edge of the sleeve. This unit is preferably not fitted with a strainer.

A second O-ring gasket 95, seal ring 97 and sleeve 99 are stacked above the flange 3 and the upper end of the sleeve is contacted by the end of plug 104. A gasket 101 is confined between the body 81 and flange 103 on the plug 104 which serves as the gasket compressing means.

The discharge opening 105 from the body extends laterally therefrom and a wall 107 extends partially across the opening. The wall and the body are bored at 109, substantially coaxially with counterbore 85, to provide a surface into contact with which the gasket 95 may be forced along with its contact with member 1 to seal the bore.

The sleeves 93 and 99 have ports or openings 110 and 111 respectively formed therein. The body 81 is spaced from sleeves 93 and 99 so that liquid can flow away from both valves and around sleeve 99 readily and without undue restriction. The openings 99 permit the passage of liquid from the second valve to the outlet 105.

In order to remove the valves for inspection, replacement or repair, it is necessary only to remove the plug 104. Thereafter the sleeve 99, seal ring 97, gasket 95 and valve 11 may be removed by engaging bail 23 of the upper valve and withdrawing the valve and associated parts from the body.

Sleeve 93, seal ring 91, gasket 89 and lower valve 11 may be removed in a similar manner by engaging a hook with bail 23 of the second valve 11. Flow in a reverse direction is prevented by the valves and seals.

*Single poppet angle check valve Figure 5*

The invention may also be applied to a single poppet angle check valve as shown in Figure 5 in which numeral 181 indicates the body is provided with a flange 183 which is counterbored at 185 to define a sealing surface which is substantially coaxial with and which is disposed above the inlet opening 187. The flange 3 of a unitary valve 11 with an attached strainer 37 rests on the flange within the counterbore and an O-ring gasket 189, through which the barrel of the valve extends, is also disposed in the counterbore in contact with flange 3, a seal ring 191 is disposed on top of the gasket and a sleeve 193 rests on the seal ring. These parts serve to compress the gasket between flange 3 and ring 191 and deform it laterally into sealing contact with sealing surface defined by the counterbore 185 and barrel 1. The sleeve is provided with circular openings 209 and the body is of greater diameter than the sleeve as shown at 210 to permit passage of liquid through the openings 209 and passage 210 to the outlet 212.

The plug 199 is screwed into the opening 208 and acts on the upper end of sleeve 193 to move it toward the gasket 189. Opening 208 is substantially coaxial with the counterbore 185, sleeve 193, ring 191, gasket 189 and valve 11.

The opening 208 is counterbored at 114 to receive an O-ring gasket 201 which is compressed therein by flange 203 on the plug.

Liquid flows from the inlet 187 through strainer 37, valve 11, inside and outside of sleeve 193 to the outlet 212.

To remove the valve it is necessary merely to remove plug 199 and lift the valve 11 as by means of a hook which engages bail 23. The flange 3 brings the associated O-ring 189, seal ring and sleeve with it.

Figure 6:
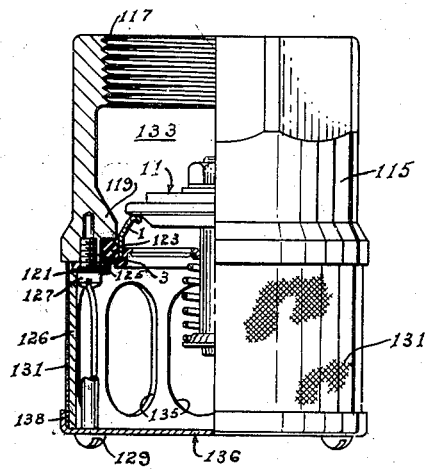
Figure 6 is a vertical sectional view of the invention applied to a single poppet foot valve.

*Single poppet foot valve Figure 6*

The invention disclosed above may also be applied to a single poppet foot valve as shown in Figure 6 in which numeral 115 indicates the valve body which is preferably provided with an internally threaded outlet 117 for attachment to a suction pipe (not shown).

The other end of the body is provided with a radially inwardly extending flange 119 which is counterbored at 121 to define a sealing surface, which is disposed substantially coaxially of said body, and to receive an O-ring gasket 123. The flange 3 of a valve 11 is seated on the gasket and is held in place by the ring 125 which is held in place by cap-screws 127.

The barrel 1 of the valve extends through the O-ring and the seals are established between the sealing surface of the counterbore and barrel as the ring 125 compresses the gasket between flanges 3 and 119. A cylindrical sleeve 126 which is perforated as at 135 is centered by the heads of screws 127 and rests on ring 125. A cylindrical strainer or screen 131 surrounds the sleeve and fits it closely. The screen rests against the end of body 115 while the sleeve preferably rests on ring 125. A cap plate 136 and screws 129 which pass through ring 125 and enter tapped holes in the body hold the sleeve and screen in place. The rim flange 138 of the cap plate lies outside of the end of the screen and fits it closely to hold and protect it.

Liquid enters the body through the screen 131 and the openings 135 of sleeve 126 and valve 11 and passes out of it through opening 117. To clean or replace the screen it is necessary merely to remove screws 129 so that the cap 136 and screen 131 may be removed. If it is necessary to inspect or replace the valve 11, the sleeve 126, screws 127 and ring 125 may be removed and thereafter the valve unit may be withdrawn from the body.

The valve and seal prevent flow in a direction reverse to that described.

The chamber 133 formed in the body preferably extends laterally beyond the periphery of the valve poppet to provide adequate cross-sectional area between the valve poppet and the body, when the valve is open, to prevent the restriction of flow through the valve and body. The sleeve 126 is provided with ports 135 which are large enough to permit relatively unrestricted flow of liquid to the valve.

Figure 7:
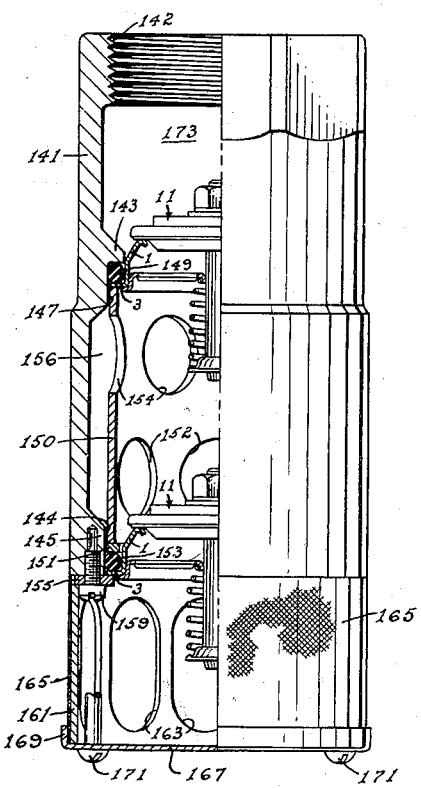
Figure 7 is an elevation partly in section showing the invention applied to a double poppet foot valve.

*Double poppet foot valve Figure 7*

The invention may also be applied to a double poppet foot valve as shown in Figure 7 wherein the body indicated by numeral 141 is provided with an internally threaded outlet 142 for attachment to a suction pipe (not shown).

The body is provided with radially inwardly extending flanges 143, 145 near the central and inlet portions of the body. Flange 143 is counterbored at 147 from the lower side to define a sealing surface which is substantially coaxial with the body, and an O-ring gasket 149 is seated therein. The flange 3 of the upper valve 11 rests on the lower side of the gasket and a sleeve 150 abuts the bottom of the flange. The sleeve is preferably provided with sets of ports 152, 154 and the body is larger than the sleeve so as to provide a passage 156 therebetween to reduce the restriction of flow around the lower valve.

Adjacent the bore 144, in the lower flange, which defines a sealing surface disposed substantially coaxially with the surface defined by counterbore 147, the sleeve rests on a seal ring 151, and an O-ring gasket 153 is confined between the ring and the flange 3 of the lower valve 11. Again, axial compression of the O-rings distorts them radially into sealing relation between the cylinders 1 and the sealing surface of the respective bore or counterbore.

A ring 155, held on the end of the body by screws 159 which enter tapped holes in the body, serves as the gasket compressing means. The ring extends inwardly under the flange 3 and compresses the entire assembly axially upwardly to compress the O-rings to seal their respective joints.

A cylindrical sleeve 161 which is ported at 163, fits over and is held against lateral displacement by the heads of screws 159 and rests on ring 155. A cylindrical screen 165 fits over the sleeve and the screen and sleeve are held in place by a cap 167, which preferably has an upturned flange 169 which fits over the edge of the screen. A number of screws 171 enter holes in the cap and threaded holes in the cap body to hold the sleeve and strainer in assembled relation on the body.

The flow of liquid is inwardly through screen 165, ports 163 of sleeve 161, lower valve 11, sleeve 150 and the ports 152, 154 and passage 156, upper valve 11, chamber 173 and outlet 142 to the suction pipe. Flow in a reverse direction is prevented by the valves.

It will be seen from the above embodiments of the invention, that all of the valves are yieldably mounted on gaskets so that any distortion of the body or displacement of associated parts under the stresses caused by screwing pipes into the body, etc., will not materially affect the seal effected by the gaskets and cannot be transmitted to the valves to cause binding of the poppets or misalignment of the parts thereof which would impair their operation or seating of the valves.

Further, the valves and strainers or screens are readily removable for inspection, cleaning, repair or replacement. Also since the removal is effected without breaking pipe joints, or in the case of the foot valve, by merely breaking a union so that the suction pipe may be withdrawn from the tank, the desired operation can be quickly effected to minimize the down-time of the associated system.

While several embodiments of the invention have been disclosed herein for purposes of illustration, it is obvious that various changes can be made in form, construction and arrangements of parts without departing from the spirit of the invention. I do not desire to be limited to the specific forms of the invention disclosed but desire protection falling fairly within the scope of the appended claims.

I claim:

1. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radiallly therefrom, a yieldable gasket disposed between said surfaces and means for deforming said gasket into sealing contact with said surfaces.

2. In a valve structure, a body defining a fluid passage having an inlet and an outlet and having a central axis and a surface disposed substantiallly coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression.

3. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression, compressing means on said body for movement toward and away from said movable member, said compressing means including means for transmitting movement from said compressing means to said movable member.

4. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression, compressing means threadedly mounted on said body for movement toward and away from said movable member, said compressing means including means for transmitting movement from said compressing means to said movable member.

5. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression, compressing means on said body for movement toward and away from said movable member said compressing means including a slidably mounted sleeve.

6. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression, said compressing means also serving to hold said member in gasket compressed condition.

7. In a valve structure, a body defining a fluid passage having an inlet and an outlet and having a central axis and a surface disposed substantially coaxial with said passage, a unitary valve assembly including a member having a seat, a guide means, a poppet mounted in said guide means for cooperation with said seat and means for urging said poppet toward said seat, said member having a sealing surface disposed substantially coaxial with said first mentioned surface and spaced radially therefrom, a yieldable gasket disposed between said surfaces and means for deforming said gasket into sealing contact with said surfaces comprising substantially radially extending members disposed on axially opposite sides of said gasket, one of said members being fixed and the other movable toward said fixed member to deform said gasket by compression, compressing means on said body for movement toward and away from said movable member said compressing means including a slidably mounted, ported sleeve.

8. In a valve structure, a body defining a fluid passage having an inlet and an outlet and having a central axis, a flange in said body encircling said fluid passage and extending inwardly from said body, means defining an opening in the body which is substantially coaxial with said flange, a substantially radial surface on said flange facing said opening, a first axially extending sealing surface on said body contiguous to said radial surface, a unitary valve assembly comprising a member having a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween to expand the gasket into sealing contact with said first and second surfaces, and a mechanism including means disposed on said body adjacent said opening for moving said movable element to and holding it in gasket compressing position.

9. In a valve structure, a body defining a fluid passage having an inlet and an outlet and having a central axis, a flange in said body encircling said fluid passage and extending inwardly from said body, means defining an opening in the body which is substantially coaxial with said flange, a substantially radial surface on said flange facing said opening, a first axially extending sealing surface on said body contiguous to said radial surface, a unitary valve assembly comprising a member including a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween to expand the gasket into sealing contact with said first and second surfaces, and a mechanism including means disposed on said body adjacent said opening for moving said movable element to and holding it in gasket compressing position, said valve, gasket and movable element being removable from said body through said opening.

10. In a valve structure, a body defining a fluid passage having an inlet and an outlet and having a central axis, a flange in said body encircling said fluid passage and extending inwardly from said body, means defining an opening in the body which is substantially coaxial with said flange, a substantially radial surface on said flange facing said opening, a first axially extending sealing surface on said body contiguous to said radial surface, a unitary valve assembly comprising a member having a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween to expand the gasket into sealing contact with said first and second surfaces, and a mechanism including a ported sleeve and means disposed on said body adjacent said opening for moving said movable element to, and holding it in gasket compressing position.

11. In a valve structure, a body defining a fluid passage having an inlet and an outlet and having a central axis, a flange in said body encircling said fluid passage and extending inwardly from said body, means defining an opening in the body which is substantially coaxial with said flange, a substantially radial surface on said flange facing said opening, a first axially extending sealing surface on said body contiguous to said radial surface, a unitary valve assembly comprising a member having a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween to expand the gasket into sealing contact with said first and second surfaces, and a mechanism including means disposed on said body adjacent said opening for moving said movable element to and holding it in gasket compressing position, said valve assembly, gasket and movable element being removable from said body through said opening, said valve assembly having a radially extending flange substantially parallel to said radial surface and in contact with said gasket for supporting the valve assembly in the body.

12. In a valve structure, a body defining a fluid passage having an inlet and an outlet and having a central axis, a flange in said body encircling said fluid passage and extending inwardly from said body, means defining an opening in the body which is substantially coaxial with said flange, a substantially radial surface on said flange facing said opening, a first axially extending sealing surface on said body contiguous to said radial surface, a unitary valve assembly comprising a member having a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween to expand the gasket into sealing contact with said first and second surfaces, and a mechanism including means disposed on said body adjacent said opening for moving said movable element to and holding it in gasket compressing position, said valve, gasket and movable element being removable from said body through said opening, said valve assembly having a radially extending flange substantially parallel to said radial surface and in contact with said gasket for supporting the valve assembly in the body, said valve flange being disposed between the radial surface and said gasket.

13. In a valve structure, a body defining a fluid passage having a central axis and having an inlet and an outlet, a flange in said body encircling said fluid passage and extending inwardly from said body to define a bore, means defining an opening in the body which is substantially coaxial with said flange bore, a substantially radial surface on said flange facing said opening, a first axially extending sealing surface on said body contiguous to said radial surface, a unitary valve assembly comprising a member including a seat, guide means, a poppet mounted on said guide means for cooperation with said seat and means for urging said poppet toward said seat, said member having a second axially extending sealing surface disposed in radially spaced relation with respect to the first axially extending surface, a yieldable gasket disposed between said first and second surfaces, an element movably mounted adjacent said first axially extending surface, on the side of the gasket opposite said radial surface for movement toward said radial surface to compress the gasket therebetween so as to expand the gasket into sealing contact with said first and second surfaces, and a mechanism including means disposed on said body adjacent said opening for moving said movable element to and holding it in gasket compressing position, said valve assembly, gasket and movable element and a part of mechanism being removable from said body through said opening, said valve assembly having said movable element attached to it for supporting the valve in the body.

14. In a valve structure, a body defining a fluid passage having an inlet and an outlet and having a central axis, axially spaced first and second flanges in said body encircling said fluid passage and extending inwardly from said body, means defining an opening in the body which is substantially coaxial with the flanges, each flange having an axially extending surface, the second flange, remote from said opening, having a substantially radial surface facing said opening, a first yieldable gasket disposed adjacent said axial surface on the first flange, a second yieldable gasket disposed adjacent said axial surface of the second flange, a unitary valve assembly for each gasket comprising a seat, guide means, a poppet mounted on said guide means for cooperation with said seat, means for urging said poppet toward said seat and a member having an axially extending sealing surface and a radial supporting flange, the member of each valve assembly extending through its associated gasket and said supporting flange contacting the gasket, compressing means mounted on the body adjacent said opening and adapted to produce an axial motion toward said radial surface, means for transmitting said motion comprising a first sleeve interposed between the compressing means and the first gasket and a second sleeve interposed between said first and second gaskets, said gaskets when axially compressed serving to expand radially into sealing relation with the associated sealing surfaces.

15. The structure defined by claim 14 wherein said sleeve are ported for the passage of liquid and said body between said first and second flanges is of greater diameter than the associated sleeve to provide a passage for liquid therebetween.

16. The structure defined by claim 14 wherein the valve supporting flange of one valve rests on the radial surface of the second flange and a seal ring is interposed between the second gasket and said second sleeve and wherein the valve supporting flange of the other valve rests upon the other end of said second sleeve and a seal ring is interposed between the first sleeve and the first gasket.

17. In a valve structure the combination of a valve body defining a fluid passage and having an inlet and an outlet, a flange on said body encircling and extending substantially radially into said passageway to define a bore, said body defining an opening which is substantially coaxial with said flange bore, a counterbore in said flange facing said opening, a unitary valve assembly comprising a seat, guide means, a valve poppet mounted in said guide means for cooperation with said seat, means for urging said poppet toward said seat, a substantially cylindrical sealing member and a substantially radial supporting flange, a gasket fitted over said sealing member, resting on said supporting flange and disposed within said counterbore, means including a seal ring disposed on the gasket, means including a sleeve, extending from the seal ring to a point adjacent the opening and a plug screwed in said opening having means for displacing said sleeve and seal ring to compress the gasket axially so as to expand it radially into sealing relation with said sealing member and counterbore.

18. The structure defined in claim 17 wherein said body is counterbored adjacent the opening to receive a gasket and said plug includes a radial flange extending over said counterbore to compress the gasket and seal the joint.

References Cited in the file of this patent

UNITED STATES PATENTS

| | | |
|---|---|---|
| 507,901 | Grist | Oct. 31, 1893 |
| 2,143,399 | Abercrombi | Jan. 10, 1939 |
| 2,370,397 | Ellinwood | Feb. 27, 1945 |
| 2,619,316 | Wilson | Nov. 25, 1952 |
| 2,658,737 | Nutter | Nov. 10, 1953 |